(12) United States Patent
Simmonds et al.

(10) Patent No.: US 9,081,178 B2
(45) Date of Patent: Jul. 14, 2015

(54) PROJECTION DISPLAY FOR DISPLAYING AN IMAGE TO A VIEWER

(75) Inventors: Michael David Simmonds, Faversham (GB); Mohamed Salim Valera, Chatham (GB)

(73) Assignee: BAE SYSTEMS plc, London (GB)

( * ) Notice: Subject to any disclaimer, the term of this patent is extended or adjusted under 35 U.S.C. 154(b) by 1880 days.

(21) Appl. No.: 11/628,092

(22) PCT Filed: Sep. 5, 2006

(86) PCT No.: PCT/GB2006/050271
§ 371 (c)(1),
(2), (4) Date: Nov. 30, 2006

(87) PCT Pub. No.: WO2007/029032
PCT Pub. Date: Mar. 15, 2007

(65) Prior Publication Data
US 2009/0190222 A1 Jul. 30, 2009

(30) Foreign Application Priority Data

Sep. 7, 2005 (EP) .................................. 05270051
Sep. 7, 2005 (GB) .................................. 0518181.3

(51) Int. Cl.
*G03B 21/14* (2006.01)
*G02B 27/01* (2006.01)
(Continued)

(52) U.S. Cl.
CPC .......... *G02B 27/0101* (2013.01); *G02B 6/0028* (2013.01); *G02B 6/0035* (2013.01); *G02B 27/0081* (2013.01); *G02B 27/0172* (2013.01); *G02B 27/4211* (2013.01); *G02B 5/18* (2013.01); *G02B 5/30* (2013.01); *G02B 6/00* (2013.01);
(Continued)

(58) Field of Classification Search
CPC ...................... G02B 27/4205; G02B 27/4211
USPC ................ 359/630–640; 385/36, 37; 345/6, 9
See application file for complete search history.

(56) References Cited

U.S. PATENT DOCUMENTS 3,493,287 A  2/1970  Lohmann
4,711,512 A * 12/1987 Upatnieks .......................... 345/7
(Continued)

FOREIGN PATENT DOCUMENTS

DE         42 11 728 A1   10/1993
DE           4211728 A1 * 10/1993  ............. G02B 27/00
(Continued)

*Primary Examiner* — Toan Ton
*Assistant Examiner* — Danell L Owens
(74) *Attorney, Agent, or Firm* — Scully, Scott, Murphy & Presser, PC

(57) ABSTRACT

A projection display is provided including a first plate-like waveguide (7), an image providing light source device (10 and 11) located to inject image bearing light into the first plate-like waveguide 7. An input means (12) is provided on the waveguide (7) to reflect the image bearing light internally along the waveguide (7). A transmission grating (13) within the first plate-like waveguide (7) is provided to output image bearing light from the waveguide (7). A second plate-like waveguide (8) is located co-planar with the first plate-like waveguide (7) and has a coupling grating (17) therein to receive the image bearing light from the first plate-like waveguide (7). The second plate-like waveguide (8) also includes an exit grating (18) therein for diffracting the received image bearing light, diffracted by the coupling grating (17) out of the second plate-like waveguide (8) towards a viewer (6).

19 Claims, 4 Drawing Sheets

(51) Int. Cl.
  *G02B 27/42* (2006.01)
  *G02B 27/00* (2006.01)
  *G02B 5/18* (2006.01)
  *G02B 5/30* (2006.01)
  *G02B 6/00* (2006.01)
  *F21V 8/00* (2006.01)

(52) U.S. Cl.
  CPC ......... *G02B 6/0015* (2013.01); *G02B 2027/015* (2013.01); *G02B 2027/0118* (2013.01); *G02B 2027/0125* (2013.01)

(56) References Cited

U.S. PATENT DOCUMENTS

| | | | |
|---|---|---|---|
| 5,106,181 A * | 4/1992 | Rockwell, III | 385/2 |
| 5,341,230 A * | 8/1994 | Smith | 359/13 |
| 5,465,311 A * | 11/1995 | Caulfield et al. | 385/27 |
| 5,745,266 A * | 4/1998 | Smith | 359/34 |
| 6,002,826 A * | 12/1999 | Veligdan | 385/120 |
| 6,169,613 B1 * | 1/2001 | Amitai et al. | 359/15 |
| 6,608,961 B2 * | 8/2003 | Travis | 385/146 |
| 6,650,822 B1 * | 11/2003 | Zhou | 385/147 |
| 6,847,488 B2 * | 1/2005 | Travis | 359/630 |
| 6,870,671 B2 * | 3/2005 | Travis | 359/443 |
| 6,883,919 B2 * | 4/2005 | Travis | 359/443 |
| 7,418,170 B2 * | 8/2008 | Mukawa et al. | 385/31 |
| 7,457,040 B2 * | 11/2008 | Amitai | 359/629 |
| 7,548,677 B2 * | 6/2009 | Bathiche et al. | 385/129 |
| 7,576,916 B2 * | 8/2009 | Amitai | 359/618 |
| 2002/0122015 A1 | 9/2002 | Song et al. | |
| 2004/0130797 A1 | 7/2004 | Travis | |
| 2004/0246391 A1 | 12/2004 | Travis | |
| 2005/0180687 A1 * | 8/2005 | Amitai | 385/31 |
| 2006/0132914 A1 * | 6/2006 | Weiss et al. | 359/462 |
| 2008/0002159 A1 * | 1/2008 | Liu et al. | 353/84 |

FOREIGN PATENT DOCUMENTS

| | | |
|---|---|---|
| EP | 0 386 643 A3 | 9/1990 |
| EP | 0 710 866 A1 | 5/1996 |
| WO | WO94/15239 a | 7/1994 |
| WO | 2004/109349 A3 | 12/2004 |
| WO | WO 2004/109349 A2 | 12/2004 |

* cited by examiner

PROJECTION DISPLAY FOR DISPLAYING AN IMAGE TO A VIEWER

CROSS-REFERENCE TO RELATED APPLICATIONS

Not Applicable

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to a projection display for displaying an image to a viewer which is particularly, but not exclusively, suitable for use in a head up display, a helmet mounted display or a head mounted display.

BACKGROUND OF THE INVENTION

2. Description of Related Art

Traditionally head up displays, which may be used in an aircraft, as shown in FIG. 1 of the accompanying drawings, use a convention spherical lens system 1 to generate a collimated display from an image provider such as a cathode ray tube 2. The light rays emanating from the spherical lens system 1 are reflected by a conventional fold mirror 3 through a spherical exit lens system 4 and from there passed to a combiner 5 from which the image is reflected to provide a collimated display to the viewer 6 such as a pilot of an aircraft. Thus with these conventional displays the collimating optics used, that is the spherical lens system 1 and spherical exit lens system 4, are unnecessarily large and bulky, which is undesirable. For example, a thirty degree field of view to be displayed to the viewer 6 may require a six inch diameter exit lens system 4. This means that the physical size of the conventional head up display as shown in FIG. 1, which includes the combiner 5 for overlaying the projected display to be viewed by a viewer 6 looking through the combiner 5, may limit the use of such a head up display in a cockpit area with insufficient space to accommodate such a head up display.

There is thus a need for a projection display which is smaller in size than conventional in order to fit into smaller spaces and thus be more suitable for restricted space environments such as an aircraft cockpit, in a helmet mounted display or a head mounted display.

BRIEF SUMMARY OF THE INVENTION

According to a first aspect of the present invention there is provided a projection display, for displaying an image to a viewer, including a first plate-like waveguide made of light transmissive material, an image-providing light source device arranged to inject image bearing light into the first plate-like waveguide, a transmission grating on or within the first plate-like waveguide arranged to direct said image bearing light internally along the first plate-like waveguide and through which the image bearing light is outputted from the first plate-like waveguide, and a second plate-like waveguide made of light transmissive and transparent material located substantially co-planar with the first plate-like waveguide, which second plate-like waveguide includes a coupling grating arranged to receive the image bearing light from the first plate-like waveguide, which second plate-like waveguide further includes an exit grating arranged to diffract received image bearing light out of the second plate-like waveguide. Preferably, the image bearing light exiting the second plate-like waveguide is directed towards a viewer.

The projection display may also include an input means coupled to or within the first plate-like waveguide arranged to direct said image bearing light on to the transmission grating of the first plate-like waveguide.

Advantageously, the light transmissive material from which the first plate-like waveguide or the light transmissive and transparent material from which second plate-like waveguide may be made of glass or plastics.

In this manner, a viewer is able to look through at least part of the material of the second plate-like waveguide and the material will also be capable of transmission of image bearing light received from the first plate-like waveguide. It will also be understood, that the user may or may not be able to see through the material of the first plate-like waveguide depending on the configuration of the projector display and its location.

Preferably, the image providing light source device may include an image generating light source.

Conveniently, the projection display may include an optical means, located between the image generating light source and the first plate-like waveguide, operable to collimate light received from the image generating light source and to inject the collimated image bearing light into the first plate-like waveguide.

Advantageously, the transmission grating may be such that incident inputted image bearing light is diffracted therefrom with the incidence angle of the diffracted light at internal surfaces of the first plate-like waveguide being greater than the critical angle for the material from which the first plate-like waveguide is made. In this manner, the diffracted light propagates internally within the first plate-like waveguide and is reflected at said internal surfaces of the first plate-like waveguide.

The transmission grating may be a low efficiency grating.

Preferably, the coupling grating may be such that incident image bearing light is diffracted therefrom with the incidence angle of the diffracted light at internal surfaces of the second plate-like waveguide being greater than the critical angle for the material from which the second plate-like waveguide is made.

Conveniently, the diffraction power of the coupling grating may be rotated through 90° with respect to the diffractive power of the transmission grating.

Preferably, the second plate-like waveguide may include a narrow band selective reflection coating provided on a surface of the second plate-like waveguide parallely spaced from the exit grating, which reflective coating is arranged to reflect light diffracted from the exit grating back to the exit grating. Thereby increasing display efficiency.

Advantageously, the first plate-like waveguide and/or the second plate-like waveguide may be curved.

The input means may be arranged to inject image bearing light via reflective or transmissive or refractive means.

The image bearing light may be diffractively inputted into the first plate-like waveguide and diffractively outputted from the second plate-like waveguide and the diffractive input and diffractive output powers may be substantially matched. The diffractive input of the first or second plate-like waveguide and the diffractive output of the first or second plate-like waveguide may be substantially matched in two orthogonal axes. In this manner, chromatic aberrations and/or geometric distortions may be corrected. A half-wave plate may be located between and substantially co-planar with the first and second plate-like waveguides. This may increase the optical efficiency of the projection display.

The projection display may form part of a Head Up Display, a Helmet Mounted Display or a Head Mounted Display.

BRIEF DESCRIPTION OF THE SEVERAL VIEWS OF THE DRAWINGS

The invention will now be described by way of example only, with reference to the accompanying drawings, in which.

DETAILED DESCRIPTION OF THE INVENTION

Figure 1:
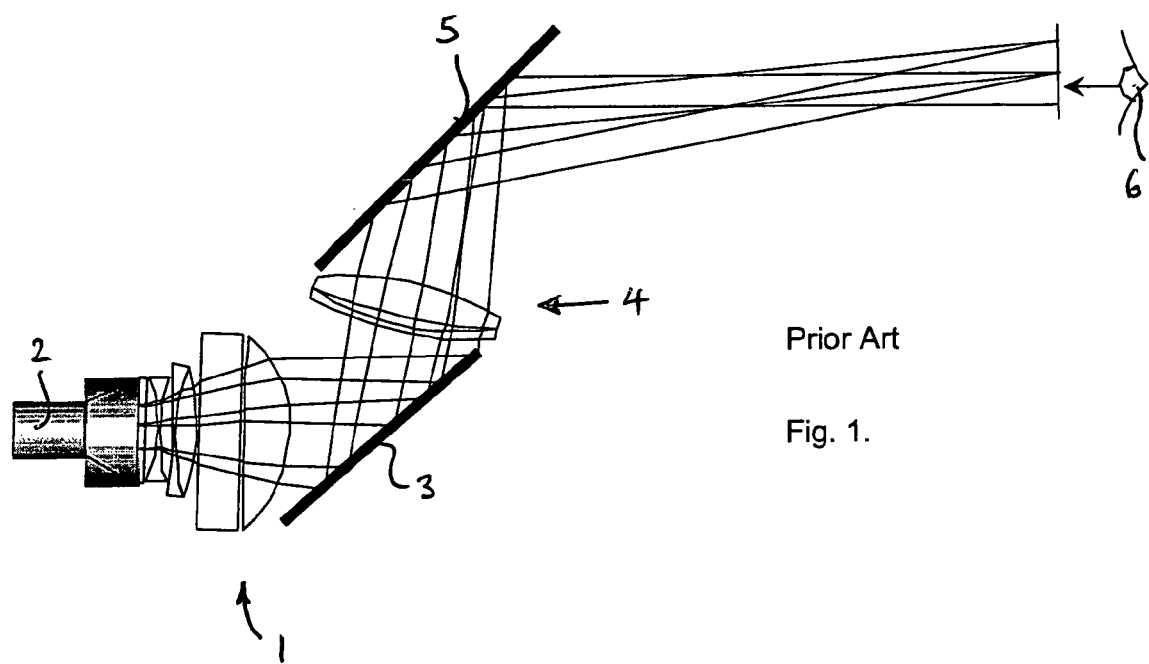
FIG. 1 is a schematic illustration of a prior art conventional projection display in the form of a head up display.
Figure 2:
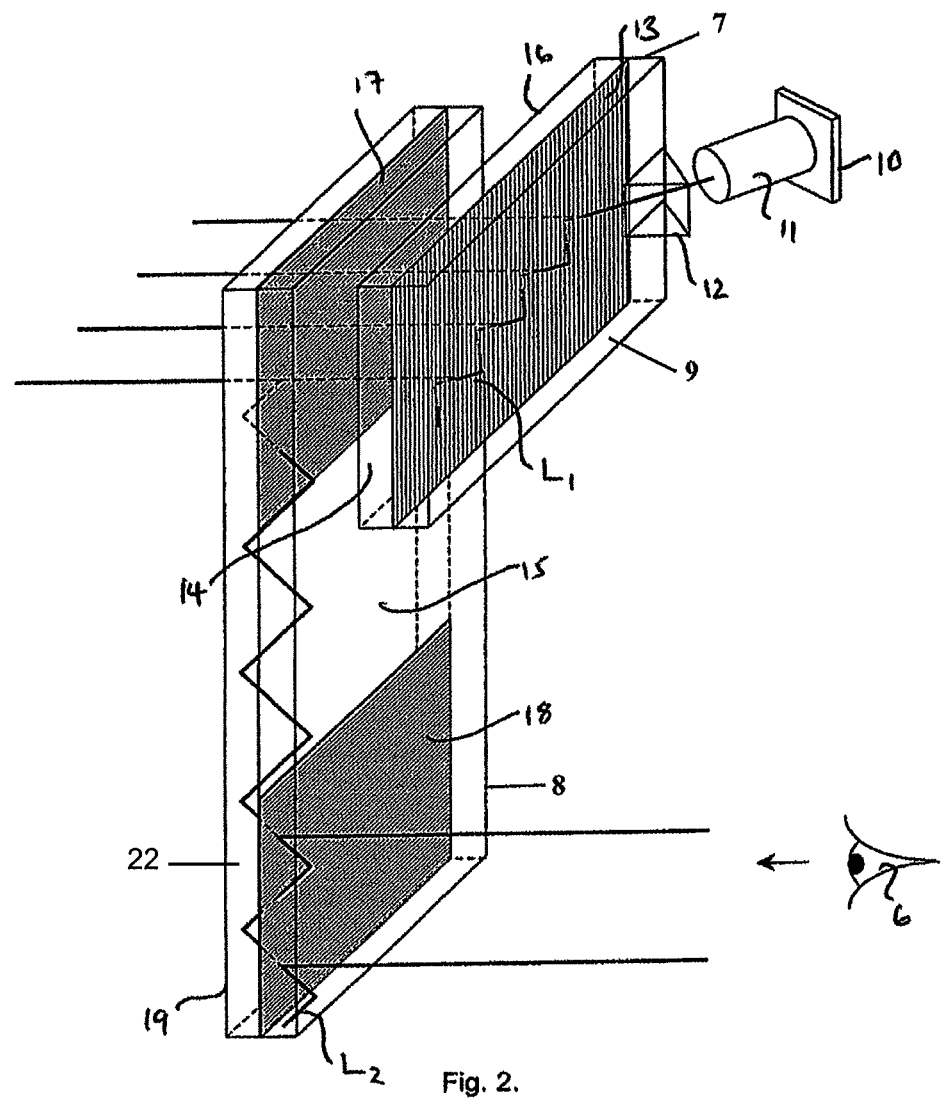
FIG. 2 is a perspective view of the projection display according to one aspect of the invention.
Figure 3:
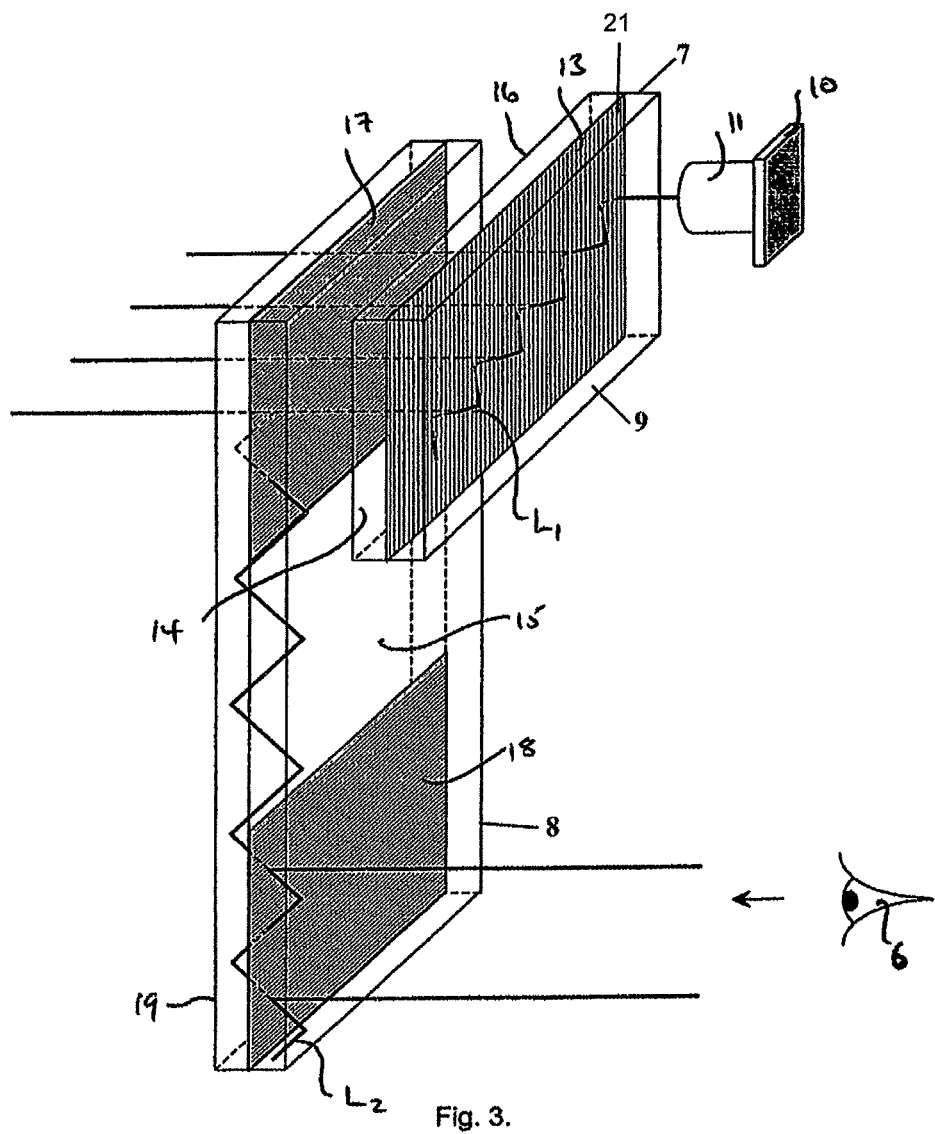
FIG. 3 is a perspective view of a projection display according to an alternative embodiment of the present invention.
Figure 4:
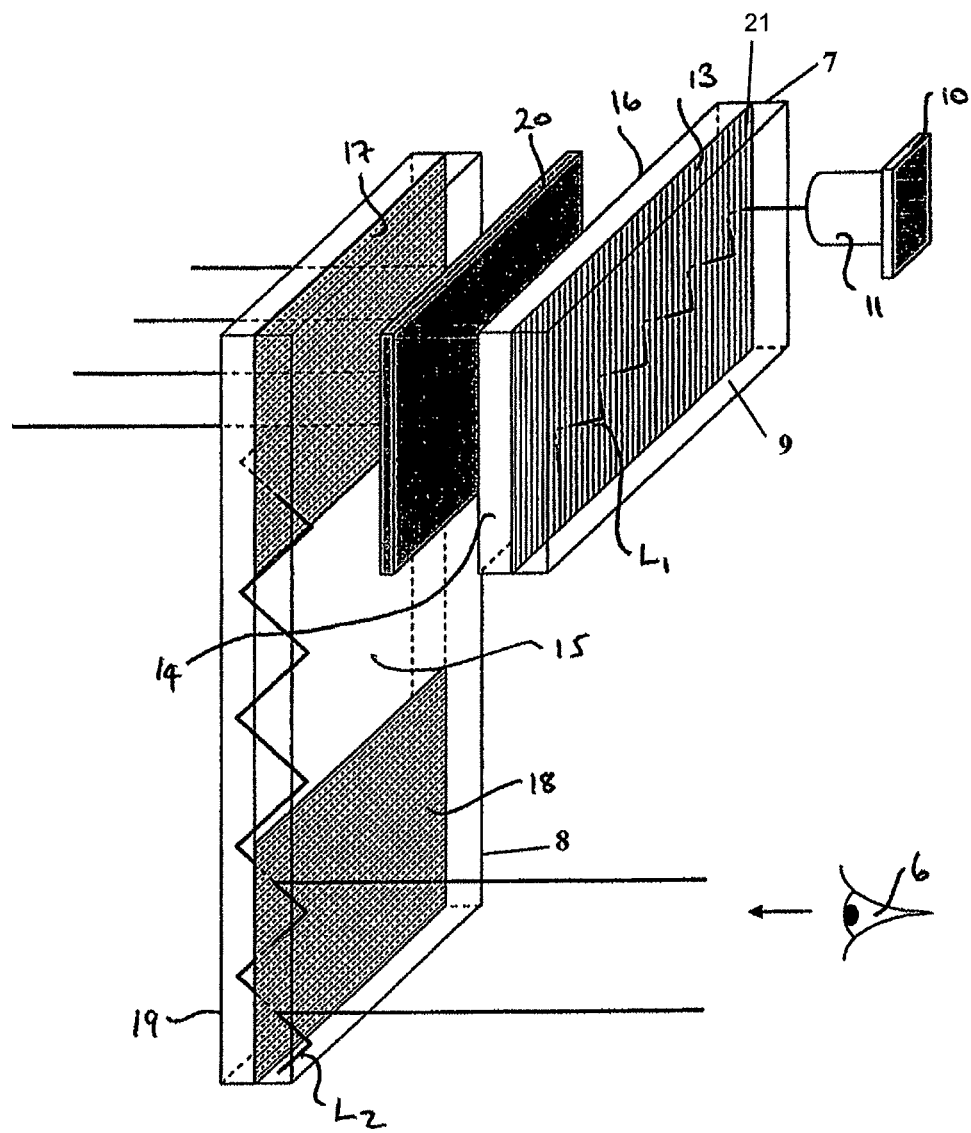
FIG. 4 is a perspective view of a projection display according to another alternative embodiment of the present invention.

A projection display for displaying an image to a viewer 6 according to the invention as illustrated in FIGS. 2, 3 and 4 of the accompanying drawings in general uses waveguiding techniques to generate a collimated display subtending a large exit pupil at the point of a viewer 6 and a large field of view while using a small image-providing light source device. As illustrated, the projection display of the invention uses a first plate-like waveguide 7 made of light transmissive material such as glass or plastics and a second plate-like waveguide 8 made from a light transmissive and light transparent material such as glass or plastics.

In more detail, a projection display according to one aspect the present invention, as illustrated in FIG. 2, additionally includes an image-providing light source device located at a first face 9 of the first plate-like waveguide to inject image bearing light into the first plate-like waveguide 7 through the first face 9.

The image-providing light source device includes an image generating light source 10 preferably in the form of a micro-display to provide a display of information. Additionally the image-providing light source device includes an optical means 11 located between the image generating light source 10 and the first face 9 of the first plate-like waveguide 7. The optical means 11 is operable to collimate light received from the image generating light source 10 and inject the collimated image bearing light into the first plate-like waveguide 7 through the first face 9. The optical means 11 preferably is of a small size, typically less than 25 millimeters in diameter, and is used to collimate the light received from the image generating light source 10. The collimated light produced by the optical means 11 has a small exit pupil and is fed into the first plate-like waveguide 7, which performs the function of stretching the horizontal pupil. The output from the first plate-like waveguide 7 is fed into the second plate-like waveguide 8 which stretches the vertical pupil view and also acts as a combiner for the projection display. In this manner, the display information provided to the viewer 6 looking through the plate-like waveguide 8 subtends a large exit pupil and a large field of view whilst using a small optical means 11 and a small image generating light source 10, such as a micro display. This enables the projection display of the invention to be very compact in comparison with conventional displays.

The information to be provided to the viewer 6 is in the form of a display of information which is generated by the image generating light source 10 that is illuminated with visible monochromatic laser light. The micro-display forming the image generating light source 10 may be either reflective or transmissive such that, in conjunction with the optical means 11, a collimated image of the display is generated for injection into the first plate-like waveguide 7.

In the embodiment illustrated in FIG. 2, the projection display includes an input means such as an input prism 12 provided on or within the first plate-like waveguide 7, at the first face 9, and is arranged to transmit the image bearing light received from the optical means 11 at the hypotenuse face of the input prism 12 on to a transmission grating 13 arranged internally within the first plate-like waveguide 7 and substantially co-planar with the first face 9. In effect, the light impinging on the transmission grating 13 diffracts therefrom such that the incidence angle of the light of the internal surfaces of the first plate-like waveguide 7 is greater than the critical angle for the material, such as glass, from which the first plate-like waveguide 7 is made. Preferably, the spatial frequency of the transmission grating 13 is such as to constrain the required angular range beyond the critical angle of the material, such as glass, from which the first plate-like waveguide 7 is made. This light is constrained within the first plate-like waveguide 7 to propagate along the first plate-like waveguide 7 reflecting from each internal surface in turn to follow light path $L_1$. Thus, the relative field angles of the light incident on the first plate-like waveguide 7 at the first face 9 are preserved within the first plate-like waveguide 7 and the information required to regenerate the original image is preserved.

Light absorption material, not shown, is provided at end 14 of the first plate-like waveguide 7 to absorb any light reaching the end 14.

The transmission grating 13 also serves to output the image bearing light from the first plate-like waveguide 7. The transmission grating 13 is a low efficiency grating which diffracts a small amount of light out of the first plate-like waveguide 7 on each interaction with the incident light rays. This transmission grating 13 preferably is only a few percent efficient and light diffracted by the transmission grating 13 is allowed to escape from the waveguide 7.

The second plate-like waveguide 8 is located with a first face 15 co-planar with a second face 16 of the first plate-like waveguide 7 and is arranged to receive the image bearing light exiting the second face 16 of the first plate-like waveguide 7. The first face 15 of the second plate-like waveguide 8 is located adjacent and close to, but not touching, the second face 16 of the first plate-like waveguide 7. The second plate-like waveguide 8 includes a coupling grating 17 located therein arranged substantially co-planar to the first face 15 of the second plate-like waveguide 8 and the coupling grating 17 is operable to diffract each impinging ray of image bearing light received from the transmission grating 13 of the first plate-like waveguide 7 at an angle which is larger than the critical angle for the material from which the second plate-like waveguide 8 is made and therefore received image bearing light will propagate inside the second plate-like waveguide 8 to follow light path $L_2$. The image bearing light continues along light path $L_2$ to an exit grating 18 arranged on or within the waveguide 8 which is arranged to diffract the received image bearing light out of the second plate-like waveguide 8 towards a viewer 6.

Preferably, the coupling grating 17 is arranged such that its diffractive power is rotated through 90° to that of the diffractive power of the co-planar transmission grating 13 to rotate incident light towards the exit grating 18.

The exit grating 18 is a low efficiency grating, such that as rays propagate along light path $L_2$ within the second plate-like waveguide 8 at each interaction with the exit grating 18 a small proportion of light is diffracted out of the second plate-like waveguide 8. Light which is not diffracted out of the second plate-like waveguide 8 light continues to propagate within the second plate-like waveguide 8. A large number of parallel rays therefore exit the second plate-like waveguide 8 through the exit grating 18 towards the viewer 6, which originated at discrete points on the micro-display forming the image generating light source 10.

It will be understood that the exit grating 18 not only diffracts light towards the viewer 6 but also diffracts light away from the viewer 6. Preferably, a narrow band selective reflection coating, 22 is provided on at least part of a second face 19 of the second plate-like waveguide 8 opposite to and parallely spaced from the first face 15 to reflect light diffracted from the exit grating 18 back to the exit grating 18 to increase display efficiency.

Preferably, the coupling grating 17 and/or the formation of the exit grating 18 are such so as to co-operate to generate a multiplicity of overlapping display images. To this end the exit grating 18 can be provided not only at the first face 15, but may be duplicated within the body of the second plate-like waveguide 8 and additionally at the second face 19 thereof. Furthermore, the coupling grating 17 and the exit grating 18 can have substantially the same spatial frequency, thus cancelling any chromatic aberration introduced by the coupling grating 17. Advantageously, the transmission grating 13, the coupling grating 17 and exit grating 18 can have substantially the same spatial frequency to assist in creating a simple, low cost optical configuration.

Although the first and second faces 9 and 16 of the first plate-like waveguide 7 and the first and second faces 15 and 19 of the second plate-like waveguide 8 have been shown as planar in the illustrated embodiment of the invention either the first and second faces 9 and 16 of the first plate-like waveguide 7 and/or the first and second faces 15 and 19 of the second plate-like waveguide 8, if desired, can be made curved.

FIG. 3 illustrates an alternative embodiment of the present invention, wherein like references have been used to indicate similar integers as those shown in FIG. 2.

FIG. 3 illustrates a further alternative embodiment of the present invention, wherein there is provided an alternative arrangement for injecting image bearing light into the first plate-like waveguide 7 having an image generating light source 10 and optical means 11 arranged to inject the image bearing light directly into the first face 9 of the first plate-like waveguide 7, where upon a semi reflective surface or hologram region 21 (described and illustrated in more detail in our co-pending application US2008285137), arranged parallel with first face 9 and within the material of first plate-like waveguide 7, is arranged to direct the image bearing light along the first plate-like waveguide 7. In this manner, the image bearing light is diffractively injected into the first plate-like waveguide 7, without the need for input prism 12, as opposed to transmissively injected as illustrated with reference to FIG. 2. The image bearing light continues through the first and second plate-like waveguides 7 and 8 in the manner as described with reference to FIG. 2, along light paths $L_1$, and $L_2$.

The diffractive injection of image bearing light illustrated in the embodiment of FIG. 3 has the effect of mitigating chromatic aberration of the transmission grating 7 and allows broadband or a multiple colour image generating light source 10 to be used.

The diffractive injection of image bearing light, as illustrated in FIG. 3, has the effect of mitigating chromatic aberration introduced by the transmission grating 13. Equally, the correct pairing of the coupling grating 17 and the exit grating 18 pair associated with the second plate-like waveguide 8 has a similar correcting or mitigating effect of chromatic aberration. A diffractive surface can exhibit large amounts of dispersion of incident light. This can result in light rays having the same or similar field angles, but which differ in wavelength, being diffracted into different internal angles within a waveguide, for example the first or second plate-like waveguides 7 or 8. This can result in large amounts of chromatic aberration at an output of a projection display. However, if the dispersion associated with an input hologram to a waveguide is substantially matched in an opposing sense with the dispersion associated with an output hologram from the waveguide, then the net chromatic dispersion will approach or substantially equal zero. For example, matching of the coupling grating 17 and exit grating 18 in this manner will provide a net chromatic dispersion of substantially zero. This result is advantageous for projection displays used in head mounted or helmet mounted applications that incorporate waveguides as it allows the use of a small, cheap and broadband image generating light source 10 in place of a relatively costly, bulky and high powered monochromatic light source, for example a laser, to illuminate the waveguides. Such a result also allows the projection display to correctly present multiple colour or full colour display information to a viewer 6.

Furthermore, diffractive injection of image bearing light, as illustrated in FIG. 3, has the effect of mitigating geometric distortion introduced by the transmission grating 13. Equally, the correct pairing of the coupling grating 17 and the exit grating 18 pair associated with the second plate-like waveguide 8 has a similar correcting or mitigating effect of geometric distortion. A diffractive surface should behave according to its associated grating equation which defines a non-linear relationship. This means that linear field angles injected refractively into a waveguide, for example first plate-like waveguide 7, as illustrated in the embodiment of FIG. 2, will diffract to a non-linear set of field angles exiting the first plate-like waveguide 7. This will result in geometric image distortion of the image bearing light as it travels along the transverse axis of the first plate-like waveguide 7. However, the diffractive injection of image bearing light into the first plate-like waveguide 7, as illustrated in the embodiment of FIG. 3, introduces inverse non-linearity to that associated with the diffractive output from the first plate-like waveguide 7. Therefore, geometric distortion correction of the image is achieved along the transversed axis of the first plate-like waveguide 7. This result is advantageous as it mitigates or obviates the requirement for image manipulation of display information presented by the light source 10, i.e. the microdisplay, to the first plate-like waveguide 7. Accordingly, this reduces or removes the requirement for image warping electronics and associated computing power to operate complex warping algorithms.

Referring to FIG. 4, wherein there is illustrated a further alternative embodiment of the present invention, wherein like references have been used to indicate similar integers as those used in FIGS. 2 and 3. In this embodiment, there is provided a half-wave plate 20 arranged between and co-planar with the first plate-like and the second plate-like waveguides 7 and 8. The effect of the passage of image bearing light passing through the projection display is to polarise the image bearing light such that it is largely S-polarisation in nature. However, the coupling grating 17 is arranged to have its diffractive power rotated through 90° with respect to transmission grating 13. Therefore, the addition of the half-wave plate 20 acts to rotate S-polarised image bearing light exiting the first plate-like waveguide 7 through 90° such that it is efficiently coupled into the second plate-like waveguide 8. The use of the half-wave plate 20 tends to increase the optical efficiency of the projection display and tends to reduce the power requirements of image generating light source 10.

Additionally, the projection display illustrated according to the invention can form part of a Head Up Display, of a Helmet Mounted Display and/or of a Head Mounted Display, particularly for aircraft usage.

What is claimed is:

1. A projection display, for displaying an image to a viewer, comprising:
   a first plate waveguide made of light transmissive material;
   an image-providing light source device arranged to inject image bearing light into the first plate waveguide;
   a transmission grating within the first plate waveguide;
   an input device within the first plate waveguide arranged to direct the image bearing light onto the transmission grating of the first plate waveguide;
   the transmission grating being arranged to direct said image bearing light internally along the first plate waveguide and to output the image bearing light from the first plate waveguide; and
   a second plate waveguide made of light transmissive and transparent material, said second plate waveguide includes a coupling grating arranged to receive the image bearing light from the first plate waveguide, said second plate waveguide further includes an exit grating arranged to diffract received image bearing light out of the second plate waveguide,
   wherein image bearing light is diffractively inputted into the first or second plate waveguide and diffractively outputted from the first or second plate waveguide and the diffractive input and diffractive output powers are substantially matched, and
   dispersion associated with the diffractive input is oppositely matched with dispersion associated with the diffractive output thereby causing the net chromatic dispersion to a roach or substantially equal zero.

2. A projection display, according to claim 1, wherein the light transmissive material from which the first plate waveguide or light transmissive and transparent material from which the second plate waveguide are made is glass or plastics.

3. A projection display, according to claim 1, wherein the transmission grating is such that incident inputted image bearing light is diffracted therefrom with the incidence angle of the diffracted light at internal surfaces of the first plate waveguide being greater that the critical angle for the material from which the first plate waveguide is made.

4. A projection display, according to claim 1, wherein the transmission grating is a low efficiency grating.

5. A projection display, according to claim 1, wherein the coupling grating is such that incident image bearing light is diffracted therefrom with the incident angle of the diffracted light at internal surfaces of the second plate waveguide being greater than the critical angle for the material from which the second plate waveguide is made.

6. A projection display, according to claim 1, wherein the second plate waveguide includes a narrow band selective reflection coating provided on a surface of the second plate waveguide parallely spaced from the exit grating, which reflective coating is arrange to reflect light diffracted from the exit grating back to the exit grating.

7. A projection display, according to claim 1, wherein the first plate waveguide is curved.

8. A projection display, according to claim 1, wherein the second plate waveguide is curved.

9. A projection display, according to Claim 1, wherein the diffractive input of the first or second plate waveguide and the diffractive output of the first or second plate waveguide are substantially matched in two orthogonal axes.

10. A projection display, according to claim 1, wherein a half-wave plate is located between the first and second plate waveguides.

11. A Head Up Display including a projection display according to claim 1.

12. A Helmet Mounted Display including a projection display according to claim 1.

13. A Head Mounted Display including a projection display according to claim 1.

14. A projection display, for displaying an image to a viewer, comprising:
   a first plate waveguide made of light transmissive material;
   an image providing light source device arranged to inject image bearing light into the first plate waveguide;
   a transmission grating within the first plate waveguide;
   an input device within the first plate waveguide arranged to direct the image bearing light onto the transmission grating of the first plate waveguide;
   the transmission grating within the first plate waveguide arranged to direct image bearing light internally along the first plate waveguide and to output image bearing light from the first plate waveguide, said outputted image bearing light being substantially polarized;
   a second plate waveguide, made of light transmissive and transparent material and including a coupling grating arranged to receive the image bearing light from the first plate waveguide, the diffractive power of the coupling grating being disposed at 90 degrees to the diffractive power of the transmission grating, the second plate waveguide further including an exit grating arranged to diffract received image bearing light out of the second plate waveguide; and
   disposed between the first and second plate waveguides, a device for rotating the polarization of the image bearing light outputted from the first plate waveguide through 90 degrees,
   wherein image bearing light is diffractively inputted into the first or second plate waveguide and diffractively outputted from the first or second plate waveguide and the diffractive input and diffractive output powers are substantially matched, and
   dispersion associated with the diffractive input is oppositely matched with dispersion associated with the diffractive output thereby causing the net chromatic dispersion to approach or substantially equal zero.

15. A projection display according to claim 14, including an input means within the first plate waveguide arranged to direct said image bearing light on to the transmission grating of the first plate waveguide.

16. A projection display according to claim 14, wherein the polarization-rotating device comprises a half-wave plate.

17. A projection display according to claim 1, wherein the input means comprises a semi reflective surface or hologram region within the first plate waveguide, arranged to direct the injected image bearing light to the transmission grating.

18. A head-up display, a helmet-mounted display, or a head-mounted display including a projection display according to claim 14.

19. The projection display according to claim 1, wherein dispersion associated with the diffractive input is oppositely matched with dispersion associated with the diffractive output for mitigating chromatic aberration.

* * * * *